United States Patent
Oglesbee

[15] 3,706,355
[45] Dec. 19, 1972

[54] RESERVOIR FOR LUBRICATING PNEUMATIC COMPONENTS

[72] Inventor: Edgar C. Oglesbee, 1819 Harvard Boulevard, Dayton, Ohio 45406

[22] Filed: June 21, 1971

[21] Appl. No.: 155,106

Related U.S. Application Data

[62] Division of Ser. No. 836,408, June 25, 1969, Pat. No. 3,595,341.

[52] U.S. Cl. ................................ 184/7 R, 184/55 R
[51] Int. Cl. .................................................. F16n 7/32
[58] Field of Search....184/55 A, 6 R, 6.26, 7 R, 7 D, 184/24, 55 R; 261/78 A

[56] References Cited

UNITED STATES PATENTS

| | | | |
|---|---|---|---|
| 3,076,525 | 2/1963 | Lansky et al. | 184/55 A |
| 3,478,843 | 11/1969 | Eckardt | 184/6.26 |
| 3,587,782 | 6/1971 | Russell et al. | 184/7 D |
| 2,753,013 | 7/1956 | Tear | 184/55 A |
| 3,432,004 | 3/1969 | Lyth | 184/7 R |

Primary Examiner—Manuel A. Antonakas
Attorney—Marechal, Biebel, French & Bugg

[57] ABSTRACT

The reservoir includes an inlet for admitting lubricating fluid and at least one outlet adapted to be connected to a lubricating device used to supply fluid to at least one pneumatic component. The same pressurized air which drives the pneumatic component at a driving pressure is connected to the reservoir, and the reservoir includes an air pressure regulator for reducing the pressure of the pressurized air to a pressure less than the driving pressure enabling the reservoir to be positionable remote from the component and at the same time to deliver fluid to the lubricating device at a pressure less than the driving pressure.

1 Claim, 4 Drawing Figures

PATENTED DEC 19 1972 3,706,355
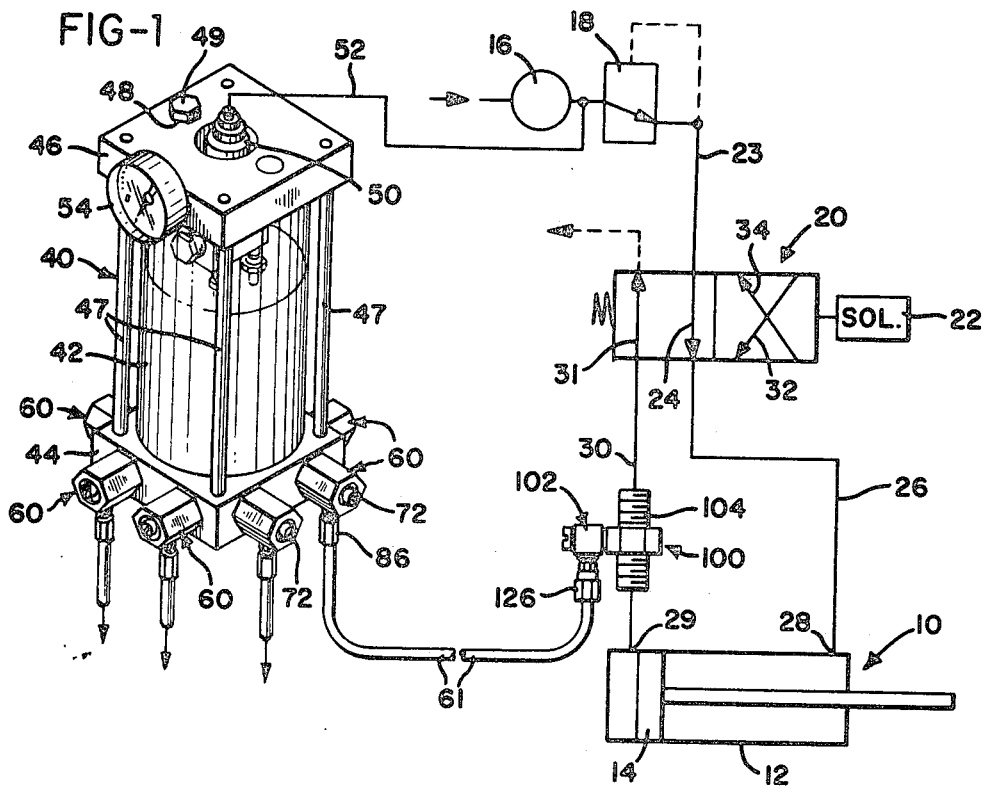
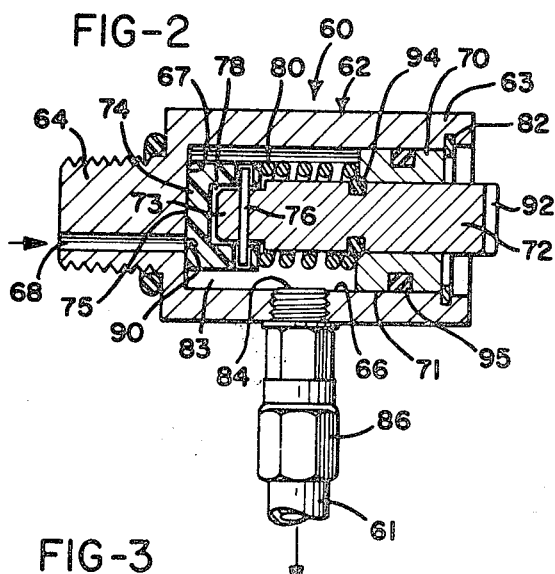
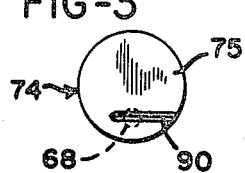
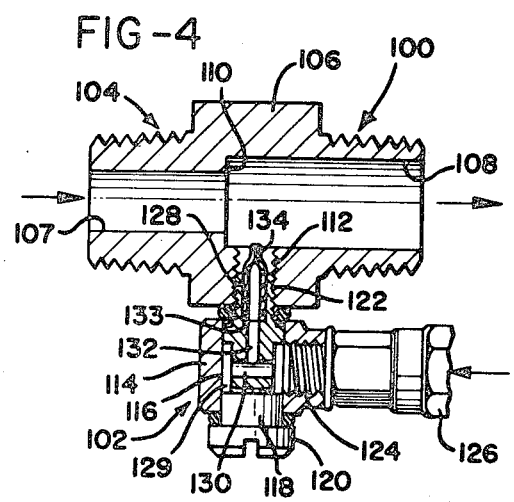
INVENTOR
EDGAR C. OGLESBEE
BY
Marechal, Biebel, French & Bugg
ATTORNEYS

3,706,355

RESERVOIR FOR LUBRICATING PNEUMATIC COMPONENTS

RELATED APPLICATION

This application is a division of application Ser. No. 836,408, filed June 25, 1969 now U.S. Pat. No. 3,595,341.

BACKGROUND OF THE INVENTION

This invention relates to automatic lubricating systems and more particularly to such systems which are adapted to air-operated motors or cylinder motors and the like.

Many oiling systems are in existence which provide a source of oil to a pneumatic motor system. Some of such systems utilize a mist or fog of oil inserted into the line upstream of the motor and/or the air control valve. Such varprized oil systems have the disadvantage that as the pressure of the oil is maintained it does not permit the oil to fall out as a liquid, and thus it is not utilized to provide lubrication to the moving parts of the cylinder. Also, much of such vaporized oil is separated out in the control valve, where very little is needed, and thus does not reach the cylinder.

A further factor in such lubricating systems is that when the pressure in the exhaust line is lowered, the air, which has been under substantial pressure, is suddenly released and the rate of flow is suddenly increased, so that there is a purging effect on both the vaporized and the separated oils which is contrary to the desired direction of oil flow in the system with a result that the oil may never actually reach the motor cylinder. The result is that the cylinder may operate with little or no lubricating oil causing a stick-slip condition of the cylinder and thereby causing improper operation.

High pressure oiling systems are known which inject a predetermined amount of oil directly into the line. Such systems are relatively costly and complex since they commonly employ a pump or other delivery devices for the high pressure injection of small precise quantities of oil into the line. Examples may be found in U.S. Pat. Nos. 950,556; 2,498,407; 2,715,454.

SUMMARY OF THE INVENTION

The present invention is directed to a low pressure lubricating system in which oil is admitted into a specially constructed fitting during the times the air pressure in an air line is reduced to a predetermined low value, such as occurs during the exhausting cycle. A suitable reservoir is supplied with oil, which is subjected to a predetermined low regulated pressure, and provides a source of oil, the rate of flow being controlled by a control valve connected to an outlet port of the reservoir.

Each system is supplied with a special T-fitting positioned in the air line to the cylinder. The T-fitting incorporates check valve means and a hydraulic dam which serves to block the lubricant and retain at least a portion of the lubricant during the purging cycle so as to provide a supply of oil for the next high pressure cycle, which supply is carried by the air into the cylinder.

By providing oil only during the low pressure portion of the cycle, low pressure conduits may be employed, such as flexible plastic tubing, to carry this oil to the T-fitting. In the practice of the present invention the oil is supplied into the air line in droplet or liquid form, ready for use by the moving parts of the system.

An object of the invention is the provision of an oiler or lubricating system including an in-line fitting which may be positioned at any convenient location on one of the air lines to a pneumatic motor and which incorporates a hydraulic dam in such a manner as to assure a supply of lubricating oil by permitting the same to be collected on an interior shoulder and carried into the cylinder by the high pressure air.

Another object is the provision in an automatic lubricating system of a T-fitting for the air line incorporating a duck-bill valve which permits flow into the air line only when the pressure in the air line is less than that of the oil in the oil feed line.

A further object of this invention is the provision of a low pressure automatic lubricating system for pneumatic piston motors and the like in which oil is supplied from a reservoir at a regulated low pressure to one or more in-line fittings which incorporate a pressure responsive valve and which operate to admit a measured quantity of oil only during the low pressure cycle of the pneumatic system.

Another object of the invention is the provision of a control valve in combination with a low pressure oiling system by means of which the rate of flow to an in-line fitting may be accurately controlled and regulated.

A still further object of this invention is the provision of an automatic lubricating system as outlined above which assures the placement of a precise and sufficient amount of oil for use by piston motors, movable control valves and the like which eliminates the necessity for high cost oil injection and atomizing systems.

DESCRIPTION OF THE DRAWING

FIG. 1 is a perspective view of an oil reservoir and its connection with the T-fitting in the air line of the air motor, showing the air motor and its related control valve and air source schematically;

FIG. 2 is a sectional view of the flow control valve;

FIG. 3 is a view of the face of the movable valve member of FIG. 2 and

FIG. 4 is a sectional view through the T-fitting of this invention including the oil check valve which receives oil from the flow control valve of FIG. 2, and the feed valve, which delivers oil to the air motor, in cooperating engagement.

DESCRIPTION OF THE PREFERRED EMBODIMENT

In the embodiment of the invention illustrated in the drawings, an automatic low pressure lubricating system is shown in FIG. 1 as including an air motor 10 which, for purposes of illustration, is shown as including a pressure cylinder 12 and a piston 14 movable therein. Air from a source (not shown) is generally passed through a filter 16 and its pressure may thereafter be regulated by air regulator 18 prior to delivery to the pressure cylinder 12 to pneumatically operate the piston 14.

Air motors 10 are commonly controlled by bi-directional control valve 20 which is controlled by suitable means, such as a solenoid 22 or the like. As shown schematically in FIG. 1, the high pressure air emitted from the regulator 18 will pass through line 23, through passage 24 in valve 20, and through line 26 into port 28 on the right side of the cylinder 12. The pressure of the air exerted against the right side of the piston 14, generally on the order of 50 psi or above, will cause it to move to the left and at the same time the air on the opposite side of the piston will exhaust or purge out of the cylinder out port 29, through line 30, and through passage 31 in valve 20 to the atmosphere. After the foregoing cycle has been completed the solenoid 22 will move the valve 20 to the left to its alternate position such that air passing through line 23 will be directed by passage 32 to line 30 and thereby subject the left side of the cylinder 14 to the high pressure air which will act to force the piston 14 to the right and the previous charge of air will exhaust through line 26 and passage 34 to the atmosphere.

The apparatus of the present invention is designed to supply the cylinder 12 with small quantities of oil for the purpose of lubricating the inside surface of the cylinder 12 and the radial surface of the piston 14 in order to increase the smoothness of operation and life of the air motor. For this purpose, an oil reservoir assembly 40 is provided which includes a transparent tank 42, a base support 44, a sealing cap 46 and a series of tie bars 47 extending between the base 44 and the cap 46. Oil may be poured into the tank 42 through an opening 48, which is provided with a cap 49. A suitable air pressure regulator 50 is positioned within the assembly 40 and has its inlet connected to receive air via line 52 from the air source (not shown) and has its outlet opening into the interior of the container 42 and is adapted to maintain a relatively constant low pressure of air on the oil in the tank 42, as indicated on gauge 54. This pressure may be in the order of 5–10 psi.

The base support 44 may be adapted, as shown, to include a plurality of flow control valves 60 each of which may be connected with the pneumatic components by low pressure conduit means 61, such as plastic tubing or the like. As shown in detail in FIG. 2, the flow control valve 60 includes a casing 62 which includes a cylindrical sleeve portion 63 and a neck portion 64 which may be a screw-threaded or otherwise affixed to the base 44. The sleeve portion 63 has a cylindrical inner surface 66, and a circular abutment surface 67 is located between the sleeve portion 63 and the neck portion 64. The neck portion 64 has a passage 68 which, as shown in FIGS. 2 and 3, is offset from the center thereof and provides communication between the reservoir 40 and the interior of the cylindrical sleeve portion 63.

The internal structure of the flow control valve 60 includes an annular bearing member 70 the external surface 71 of which provides slidable rotating engagement with the inner surface 66 of sleeve portion 63. An axially aligned cylindrical pin 72 is located centrally of the member 70. The inner end 73 of the pin 72 has a slightly reduced diameter for receiving a cup-shaped valve member 74, which may be constructed of plastic, if desired and is formed with a flat face 75. The valve member 74 is affixed to the pin 70 by suitable means such as a roll pin 76, and the cavity 78 of the member 74 is preferably slightly larger than the inner end 73 in order to provide a loose universal action for seating engagement. A spring 80 is positioned around the pin 72 intermediate the valve member 74 and the annular bearing member 70 and the face 75 of the valve member is biased in mating abutment with the surface 67 by the spring when the spring is held in biasing relation inside the sleeve portion 63 by an internal snap ring 82 or the like. The assembly thus provides a tight seal between the face 75 and the surface 67. An annular space 83 is formed in the cavity of the sleeve portion 63 and communicates with an outlet 84 which is threaded to receive a plastic tube coupling 86.

Oil from the reservoir 40 will therefore pass, due to the low pressure exerted thereon, through the bore 68 in the metering valve 60 and will be urged against the face 75 of the valve member 74. In order that the oil may be transported into the interior of the metering valve 60, the valve member 74 is provided with a small groove 90 along a chord on the circular face 75. The pin 72 is also provided with a slot 92 at its exposed end in order that the valve assembly may be rotated to a position (FIG. 3) in which the bore 68 communicates with the groove 90.

The pin 72 is provided with a circumferential groove for receiving a suitable O-ring 94 for preventing oil from seeping between the pin 72 and the bearing member 70, and the bearing member 70 is provided with a circumferential groove for receiving an O-ring 95 or the like for preventing oil from seeping between the internal surface 66 of the portion 63 and the external surface 71 of the member 70. It can thus be seen that when the valve is adjusted to a position as shown in FIGS. 2 and 3 the oil will pass into the inside of the valve 60 and into the coupling 86 for conveyance by the plastic tubing toward the air motor.

Oil, the flow of which is controlled at a relatively slow rate through the control valve 60, is delivered by the plastic tubing 61 to a novel T-fitting assembly 100 which is positioned intermediate the bi-directional valve 20 and the pressure cylinder 12 in the line 30. It should be understood that the assembly 100 could as well be located in line 26. The assembly 100 (FIG. 4) consists essentially of a check valve 102 and a feed valve 104. The feed valve 104 includes a body 106 the ends of which may be threaded or the like for connection to intermediate line 30. The body 106 is provided with dam means which conveniently may consist of a pair of bores 108 and 107 which are concentric and which define a passageway for air flow through the T-fitting 100. The bore 108 is larger in diameter than the bore 107 to provide an interior circumferential shoulder or dam 110 therein. The body 106 also has a threaded bore 112 therein positioned to open into the bore 108 just ahead of the dam 110 for receiving the check valve 102.

The check valve 102 includes a body portion 114 which has a cylindrical bore 116 therethrough for receiving a member 118 which has a nut head 120 at one end and a threaded portion 122 at the other end for threading into the bore 112. The body 114 has a threaded inlet 124 which is adapted to receive a coupling 126 for the other end of the plastic tubing 61. The cylindrical member 118 has a bore 128 in the threaded portion 122 and a circumferential groove 129 centrally of the body portion thereof. A transverse bore 130 passes through the grooved portion of the body and a narrow axial bore 132 passes from the internal bore 130 into the bore 128 providing an internal shoulder 133 in the portion 122.

It can thus be seen that when the check valve 102 is connected to the feed valve 104, the lubricant will pass through the flow control valve 60 and will eventually pass into the check valve 102 through the threaded inlet 124 and enter the member 118. It will then pass through bore 130 and bore 132 toward the feed valve 104. A duck-bill check valve 134 is inserted in the bore 128 which is of a length sufficient to permit the tip of the duck-bill 134 to be located at the approximate periphery of the bore 108 when the end thereof seats against shoulder 133. The duck-bill 134 consists of a plastic or rubbery material which will open to dispense oil from the bore 132 only when the pressure inside the member 118 is greater than the pressure in the feed valve 104.

In operation, the regulator 50 is adjusted to exert a pressure of approximately 10 psi on the lubricant in the reservoir 40 while a pressure of on the order of 100 psi is operating in the air line 23. The solenoid 22 alternately cycles the air to opposite ends of the pressure cylinder, as required. When directed through line 26 to the right side of the pressure cylinder the air will move the piston 14 accompanied by a purging effect in line 30 as it is exposed to the atmosphere. The quick release of the air through the line 30 and feed valve 104 to the atmosphere occurs at a very rapid rate until the air pressure in the cylinder 12 begins to approach atmospheric pressure. As soon as the pressure in the left side of the cylinder 12 goes below the predetermined pressure of approximately 10 psi operating on the lubricant reservoir a pressure differential will be established because the pressure in the check valve portion 102 of the system will be slightly higher than the air pressure in the bore 108 of the feed valve 104.

Accordingly, duck-bill 134 will then open and deliver a small amount of oil to the surface 108 exposed to the air by now flowing slowly out of the cylinder. The air will be traveling in a direction opposite to the directional arrows in FIG. 4 and therefore the oil will tend to move in a direction toward the shoulder or dam 110. The dam 110 will act to accumulate at least a portion of the oil emitted from the duck-bill 134, some of the oil being carried by the air through the line passage 31 to the atmosphere and some being retained in the passage 31 to lubricate the valve 20.

Then, when the valve 20 reverses directions it will supply high pressure air through the line 32 to the line 30 into the bore 106 to close the duck-bill 134. Since the diameter of bore 108 is greater than the diameter of bore 106, the shoulder 110 will create turbulence in the incoming air which will entrain and carry the oil through the remaining portion of line 30 into the left side of the cylinder 12 to lubricate the piston 14. The oil is picked up by the air and literally moved into the cylinder 12 in the form of a liquid rather than a mist or fog. Once the oil is within the cylinder the seals and the piston surface, upon reciprical motion, operate to distribute the oil to lubricate the system. In the preferred operation of the system the metering valve 60 will be adjusted to coordinate a flow of about 5 drops of oil per minute, for example, at the normal working pressure of from 9 to 10 psi.

One of the important advantages of the lubricating system of the present invention is that it is not necessary that the fitting 100 be positioned in close proximity to the cylinder or air motor which is being lubricated. While such a close positioning is desired, satisfactory results can be obtained when the fitting is positioned at some distance remote from the cylinder and, in some cases, may be positioned downstream of the air control valve. Further, while the preferred embodiment of the invention has been shown as being employed for the lubrication of an air cylinder, it may be understood that the invention may be used for lubricating other types of pneumatically driven motors, the only requirement being that, from time to time, the pressure in the feed line to the motor be reduced sufficiently below that in the oil reservoir to permit the injection of oil into the fitting 100.

While the system has been shown for providing the lubrication to a single cylinder 12, it is to be understood that the reservoir assembly 40 may be used for simultaneously providing a controlled oil supply to a plurality of individual air motors, and the rate of flow to these motors being controlled by the individual control valves 60. Therefore, the valves 60 may be so adjusted as to provide the proper lubrication for both large and small air cylinders, as the needs of the installation may require.

While the form of apparatus herein described constitutes a preferred embodiment of the invention, it is to be understood that the invention is not limited to this precise form of apparatus, and that changes may be made therein without departing from the scope of the invention.

What is claimed is:

1. In the art of lubricating pneumatically operated components such as pneumatic cylinders and the like in which a reservoir delivers lubricating oil to a plurality of individual remote lubricating devices associated with said pneumatic components including a source of air under pressure for operating said components, the improvement comprising means in said reservoir defining an inlet for the admission of lubricating oil thereinto and means defining a plurality of outlets corresponding in number to said devices, adapted to be connected one each to said devices for supplying lubricating oil thereto, a corresponding plurality of flow control valves associated with said outlets for controlling the quantity of oil flow to each of said devices, means connecting air from said source to said reservoir, and an air pressure regulator means on said reservoir for reducing the pressure of air from said source to a pressure substantially less than that of said source for causing said reservoir to deliver oil to said devices at pressures less than the operating pressures of said components.

* * * * *